(12) United States Patent
Batada et al.

(10) Patent No.: US 9,048,880 B2
(45) Date of Patent: Jun. 2, 2015

(54) KIOSK-BASED MOBILE CUSTOMER CHECK-IN

(71) Applicant: CELLCO PARTNERSHIP, Basking Ridge, NJ (US)

(72) Inventors: Asif Nooruddin Batada, Marietta, GA (US); Humphrey D. Chen, Palisades Park, NJ (US); Christopher M. Crawford, Exeter, NH (US)

(73) Assignee: Cellco Partnership, Basking Ridge, NJ (US)

( * ) Notice: Subject to any disclaimer, the term of this patent is extended or adjusted under 35 U.S.C. 154(b) by 182 days.

(21) Appl. No.: 13/660,896

(22) Filed: Oct. 25, 2012

(65) Prior Publication Data

US 2014/0120910 A1 May 1, 2014

Related U.S. Application Data

(63) Continuation-in-part of application No. 13/563,273, filed on Jul. 31, 2012.

(51) Int. Cl.
*H04W 84/00* (2009.01)
*H04W 48/20* (2009.01)
*H04B 5/00* (2006.01)
*H04W 4/00* (2009.01)
*H04W 60/04* (2009.01)
*H04W 84/04* (2009.01)

(52) U.S. Cl.
CPC ............... *H04B 5/00* (2013.01); *H04W 4/008* (2013.01); *H04W 60/04* (2013.01); *H04W 84/045* (2013.01)

(58) Field of Classification Search
CPC ..... G06Q 20/204; H04W 48/20; H04W 84/00
See application file for complete search history.

(56) References Cited

U.S. PATENT DOCUMENTS

| | | | |
|---|---|---|---|
| 2009/0052395 A1* | 2/2009 | Bao et al. | 370/331 |
| 2009/0061821 A1* | 3/2009 | Chen et al. | 455/411 |
| 2009/0061873 A1 | 3/2009 | Bao et al. | |
| 2009/0262716 A1* | 10/2009 | Kawakami | 370/338 |
| 2013/0138518 A1* | 5/2013 | White et al. | 705/16 |

* cited by examiner

*Primary Examiner* — Myron K Wyche

(57) ABSTRACT

A customer-accessible station includes a near field communication (NFC) transceiver configured to interact with another NFC transceiver of a customer's mobile station and/or a micro-cell base station subsystem for use at a premises of an enterprise includes a base transceiver system configured for wireless communication with a mobile station over a frequency band allocated for mobile traffic in a macro cellular network. A communication interface sends and receives communications for one or more mobile stations when at the premises via a packet data network. A controller coupled to the base transceiver system operates the micro-cell base station subsystem to appear as a base station similar to a base station of the macro cellular network, including enabling mobile station registration. A customer management server responds to identification of a registered mobile station by communicating information about a customer associated with the identified mobile station to a system used by enterprise personnel.

20 Claims, 10 Drawing Sheets

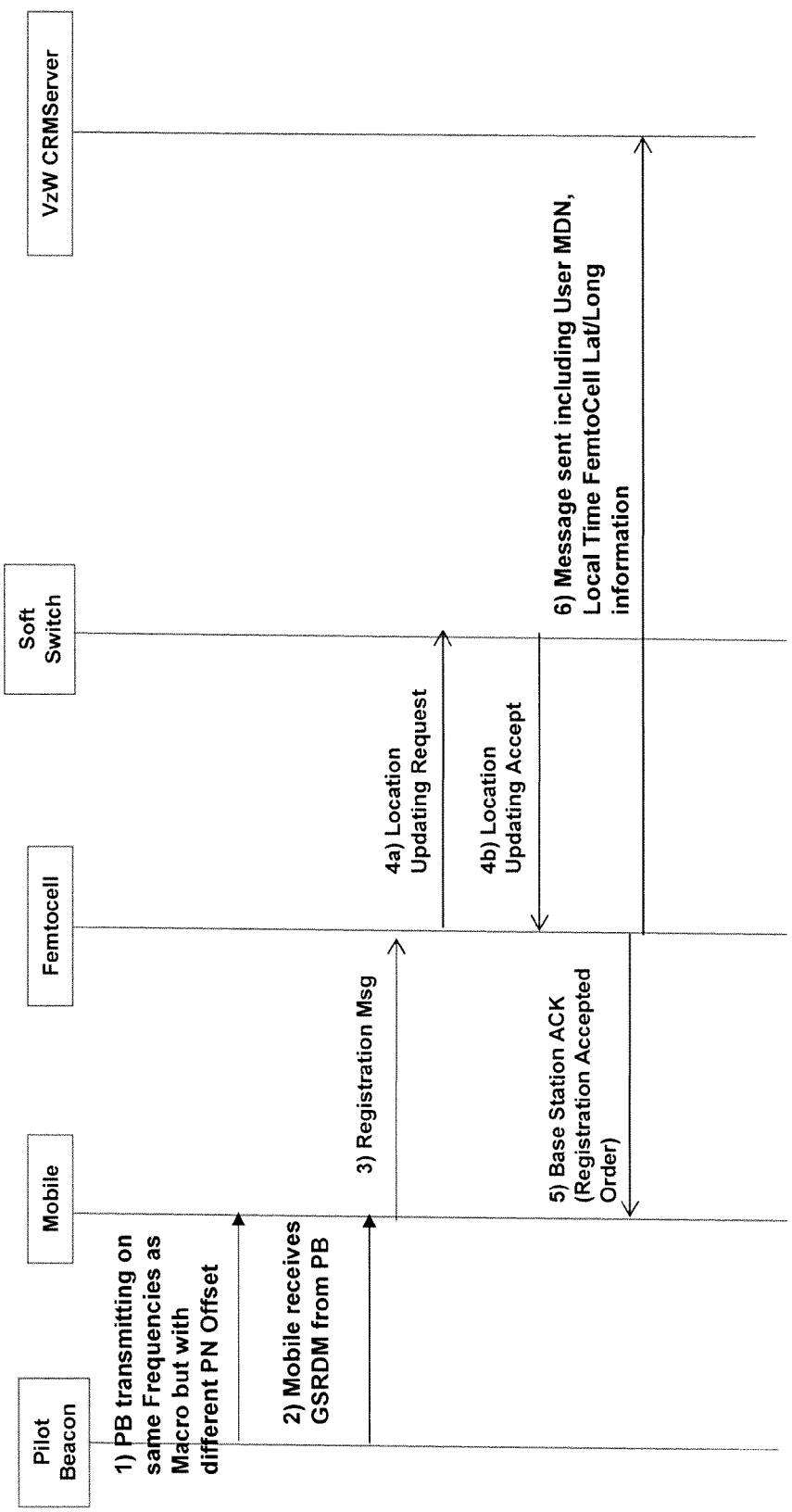

KIOSK-BASED MOBILE CUSTOMER CHECK-IN

This application is a continuation-in-part of U.S. application Ser. No. 13/563,273 filed on Jul. 31, 2012, the entire content of which is incorporated by reference.

BACKGROUND

In recent years, customer service personnel have found that providing a customer with a satisfactory experience in an enterprise, such as a commercial establishment, is increasingly difficult. Competition among other establishments, online shopping options, and the need for measures to reduce costs result in the need for a commercial enterprise to find an effective and novel way of providing a memorable and positive experience to a customer.

In general, when a customer enters an establishment, the proprietor may not be able to offer differentiated service to each customer. In addition, the proprietor may not be able to sufficiently utilize the queue time, the time between when the customer enters the establishment and the time the customer is assisted by the proprietor or establishment personnel, for each customer to tailor the service to fit the customer's needs, thereby optimizing the experience. For example, if the proprietor does not know when someone enters an establishment or specifics about who has just entered, time may be wasted identifying the presence of a potential customer as well as determining the customer's needs once the customer is assisted by the proprietor. This may result in a significantly diminished customer experience.

Some establishments personalize the customer experience by having customers check-in upon entry. However, this typically involves manual input by the customer. For example, the user may need to run a loyalty card over or through an appropriate reader. Other approaches require the user or establishment personnel to enter identification data for the customer. Check-in theoretically might be automated in response to location detection, for example, using position as determined from global positioning satellite (GPS) signals. However, GPS location determination may not be effective for some commercial establishments, such as stores in an enclosed mall, where GPS signals may be blocked by building structures.

Hence a need exists for an enhanced interaction with a customer to ensure continued patronage of the commercial establishment.

BRIEF DESCRIPTION OF THE DRAWINGS

The drawing figures depict one or more implementations in accord with the present teachings, by way of example only, not by way of limitation. In the figures, like reference numerals refer to the same or similar elements.

FIG. 1A is a high-level functional block diagram of an example of a system of networks/devices that provide various communications for mobile stations and support an example of the customer check-in.

FIG. 2 is a flowchart of an exemplary method for presenting a customer check-in in an establishment.

DETAILED DESCRIPTION

Figure 1A:
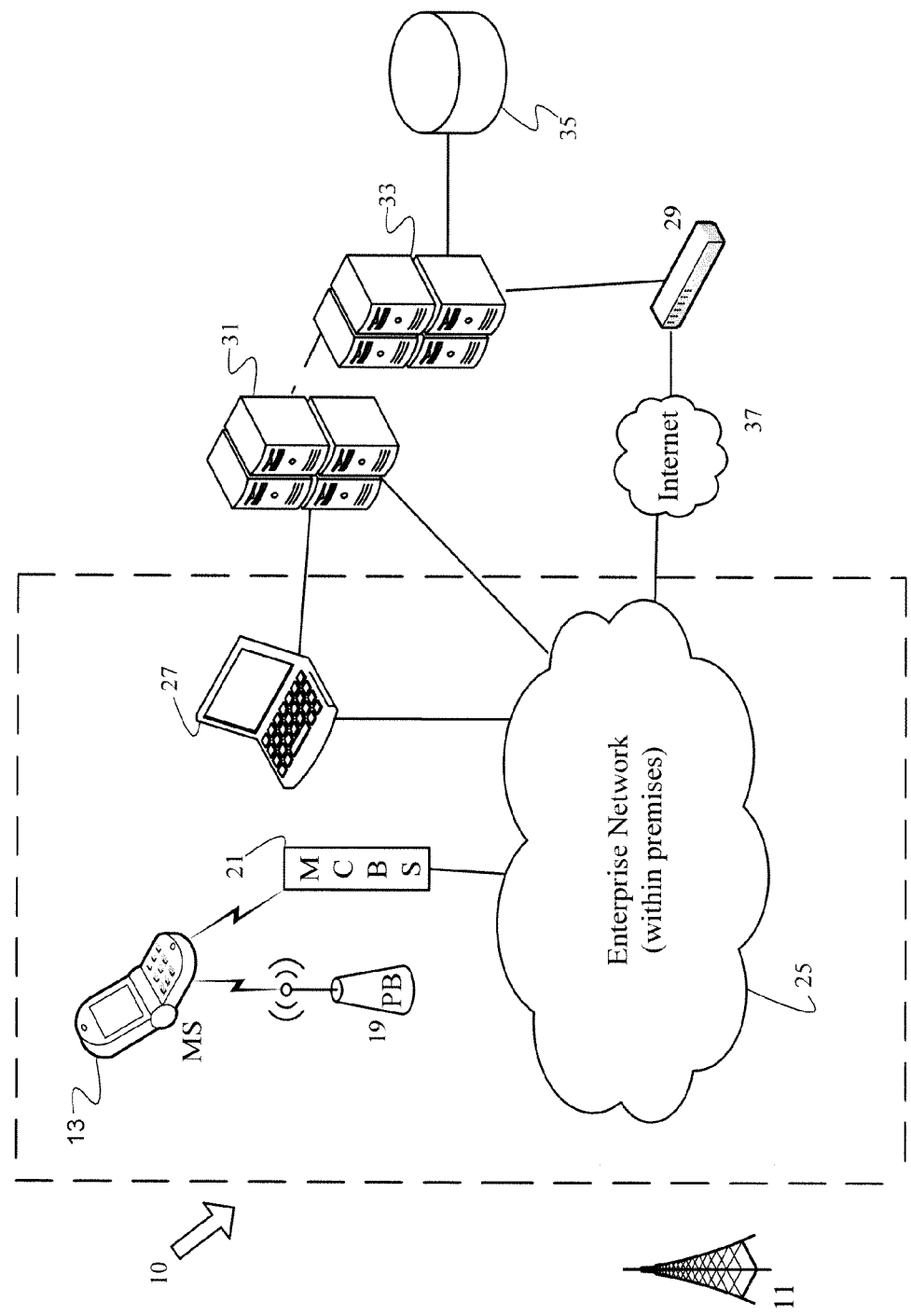

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

A disclosed exemplary system includes a micro-cell base station subsystem for installation in a premises of an enterprise. A wireless telephone base station communicates with a mobile or hand-held phone. For example, in a wireless telephone system, the signals from one or more mobile telephones in an area are received at a nearby base station, which then connects the call to the land-line network. In some examples of the present disclosure, the micro-cell base station subsystem has a base transceiver system configured for wireless communication with one or more mobile stations over a frequency band allocated for mobile traffic in a macro cellular network operating in a region outside the premises of the enterprise. Another exemplary system includes, in addition to the micro-cell base station, a customer-accessible station such as a kiosk for the customer to actively register a mobile station. The micro-cell base station subsystem may be turned so that it meets the FCC part 15A requirements of very low power communication. This exemplary system may further include a near field communication (NFC) transceiver configured to interact with another NFC transceiver of a customer's mobile station.

In the present disclosure, a customer-accessible station is a terminal or station accessible by a customer to allow for check-in which the customer's mobile station. A kiosk is one example of a customer-accessible station.

Another exemplary system includes a customer-accessible station, and a near field communication base station associated with the customer-accessible station. The system includes a near field communication transceiver configured for wireless communication with one or more mobile stations; and a communication interface, coupled to the near field communication transceiver, configured to send and receive communications of the one or more mobile stations via a network. A customer management server is configured to respond to identification of a mobile station upon registration by communicating information about a customer associated with the identified mobile station to a system used by personnel of the enterprise at the premises in interacting with the customer while the customer is at the premises.

Another exemplary system includes a customer-accessible station, and a transducer associated with the customer-accessible station configured to detect a predetermined sound, such as a high frequency encoded sound, from one or more mobile stations; and a communication interface, coupled to the transducer and speaker, configured to send and receive communications for the one or more mobile stations. A customer management server is configured to obtain an identification of a mobile station from the high frequency encoded sound and to respond to identification of a mobile station upon registration by communicating information about a customer associated with the identified mobile station to a system used by personnel of the enterprise at the premises in interacting with the customer while the customer is at the premises.

Another exemplary system includes one or more computer processors, and a non-transitory computer readable medium containing instructions that, when executed, cause the one or more processors to perform the steps of detecting when a mobile station is brought within approximately 10 cm or less of a near field communication terminal containing a near field communication transceiver at a premises of an enterprise; transmitting a signal from the near field communication transceiver; receiving, via the NFC transceiver, a registration message from a mobile station in the premises responsive to the transmitted signal, the registration message identifying the mobile station; communicating via a packet data network to register the identified mobile station with a macro cellular network; and upon registering the identified mobile station, forwarding information about a customer associated with the identified mobile station to a system used by personnel of the enterprise at the premises in interacting with the customer while the customer is within the premises of the enterprise.

A macro cellular network is a radio network distributed over land areas called cells, each served by at least one fixed-location transceiver, to provide radio coverage over a wide geographic area. Micro cellular networks are much smaller in size, for example, about the range of 1 mile or smaller. Further characterization of micro-cellular networks includes pico cells, which generally have a range of 100-400 meters, and femto cells, which generally have a range of 10 to 40 meters.

The micro-cell base station subsystem has a communication interface, coupled to the base transceiver system, configured to send and receive communications for the one or more mobile stations via a packet data network. A controller coupled to the base transceiver system and the communication interface operates the micro-cell base station subsystem to appear to the one or more mobile stations as a base station similar to a base station of the macro cellular network, including enabling mobile station registration through the micro-cell base station subsystem.

A softswitch coupled to the packet data network for communications with the micro-cell base station subsystem may be configured to enable mobile station registration with the macro cellular network through the micro-cell base station subsystem.

Micro-cell base station could be setup such that it does not have real-time connection into a softswitch. Instead it extracts temporary ID or MEID or IMEID that is transmitted by mobile during the handshake and makes a call to MNOs' databases to get the corresponding MDN (mobile directory number).

A customer management server may be configured to respond to identification of a mobile station, upon registration with the softswitch through the micro-cell base station subsystem or by database lookup, by communicating information about a customer associated with the identified mobile station to a system used by personnel of the enterprise at the premises in interacting with the customer while the customer is at the premises. For example, the information may inform enterprise personnel of the customer arrival at the premises and thereby allow enterprise personnel to adapt their interaction to the particular customer. For example, when a high value customer (as identified by the database and meets certain guidelines such as amount of sales in a certain time period, amount of sales alltime, longevity of the customer's relationship with the establishment, customer's net worth, or other criteria selected by the establishment) enters the establishment, a manager may be notified who comes out to greet the high value customer to give superior customer service.

In other embodiments, for example, in a theme park, queue wait time for different rides can be displayed in an application or made publically available so that statistics can computed, e.g. during this week, on Monday, wait time is on average 10 mins, on Tuesday . . . etc.

In other examples, the mobile station user's name may be entered into a Queue Management system. This enables a user to view his position in the queue by opening up the retailer's application. Further, it enables the retailer to also display expected wait time to a new customer who enters the queue.

In another embodiment, the customer can also obtain a position in the queue remotely thru the retailer's application so that when the customer is driving to the geographic area, the customer's position in the queue may be held (thereby allowing the retailer to put a policy in place in which a customer can remotely put himself in the queue only once). The customer may enter the queue either via an application on the mobile station, via the retailer's website, over the phone, or another way. Then, when the customer arrives at the establishment, the store may be notified that the customer has arrived. This notification may be active, such as the customer interacting with a kiosk equipped with NFC or short-range femtocell at the establishment, or passively, via femtocell or Bluetooth beacons sensing when the mobile station of the customer has entered the establishment.

With a mapping application that has indoor mapping capability, in one embodiment the mobile station is also able to show wait times at different retailers, e.g. a bank or post-office or at different cash registers within a department store. The mapping application may further be able to advise a customer as to the order in which the customer should go about performing various tasks if a shopping or task List is provided to the mapping application.

In one embodiment, the check-in kiosk (with supporting software) is offered as a cloud-based service to retailers. In different embodiments, the check-in kiosk is setup such that only one retailer communicates with the kiosk or, in case of a mall or other shopping area, multiple retailers communicate with the kiosk so with a single pass of the mobile station, a customer is able to check-in with multiple retailers and get tailored offers or services.

An exemplary method discussed herein involves transmitting a pilot beacon signal at a premises of an enterprise, from a base transceiver system of a micro-cell base station subsystem. The base transceiver system is configured for wireless communication with one or more mobile stations over a frequency band allocated for mobile traffic in a macro cellular network operating in a region outside the premises of the enterprise. The method may involve receiving, via the base transceiver system, a registration message from a mobile station in the premises, based at least in part of the pilot beacon signal. The registration message identifies the mobile station.

A packet data network may be used to communicate with a softswitch to register the identified mobile station with the macro cellular network, for mobile communication service through the micro-cell base station subsystem. Upon registering the identified mobile station for mobile communication service through the micro-cell base station subsystem, or through database lookup, information about a customer associated with the identified mobile station may be forwarded to a system used by personnel of the enterprise at the premises in interacting with the customer while the customer is within the premises of the enterprise, e.g., to allow adaptation to the particular customer.

Figure 1B:
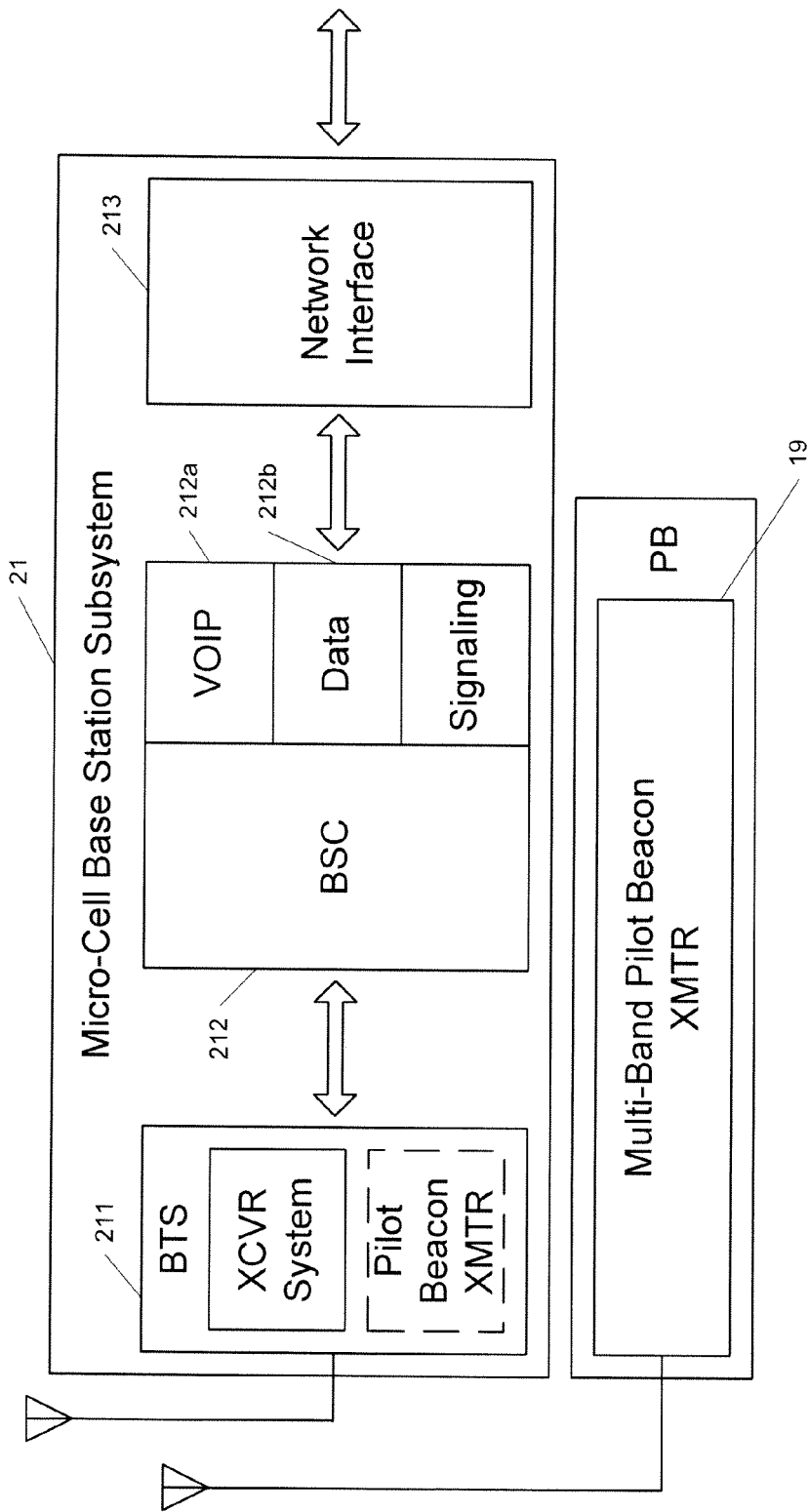
FIG. 1B is an expanded view of the micro-cell base station subsystem and pilot beacon of FIG. 1A.

Reference now is made in detail to the examples illustrated in the accompanying drawings and discussed below. FIGS. 1A, 1B and 2 illustrate a system and methodology to automate a "check-in" or the like at an enterprise premises in response to or based on signaling with a mobile station (MS) of the customer to determine when the customer has entered an enterprise facility, such as a commercial establishment. The signaling provides an identifier of the mobile station and/or the customer to a system of the proprietor of the enterprise. The identification can serve logically as a 'customer check-in,' for example, to allow a representative of the proprietor to automatically obtain both an indication of that a new customer has entered the establishment as well as customer specific information from a database and use that information in initial interaction with the customer, thus enhancing the customer experience.

The automated check-in technique for obtaining the identifier from the mobile station is a passive check-in approach involving the use of a micro-cell, such as a femto/pico cell, system to provide mobile communications for customers or other patrons within the commercial establishment.

In many areas today, one or more wireless service providers or carriers operate a macro network to provide wireless mobile communications services over a radio airlink for mobile stations (MS) 13. Typically, such a macro network uses a 'cellular' architecture. A carrier providing service throughout the country will operate similar networks in various geographic regions. Based on the regulatory scheme, the carrier's networks in different areas may operate on different frequency bands. In some countries, particularly in the USA, a number of carriers operate two or more such networks and compete for providing services to mobile customers.

The transceiver system of the micro-cell base station subsystem 21 is capable of operating on a selected one or more of the frequency bands used by the macro cellular networks, that is to say in one or more regions outside of an enterprise premises 10. The particular band(s) used by the base transceiver system 211 may be one of the bands used by a macro network in a region around the premises or may be a band that is unused in the surrounding area but used in other more remote areas. However, the mobile stations 13 provided to the carrier's users/customers are capable of operating on the various bands assigned to the carrier's network throughout the carrier territory or territories of operation and in some cases, bands used by competing carriers. The bands of mobile station operation will include the band or bands used by the base transceiver system 211 of the micro-cell base station subsystem 21.

In FIG. 1A, the exemplary system uses at least one micro-cell (MC) base station (BS) 21 installed within the enterprise premises 10. The micro-cell base station subsystem 21 may include a pilot beacon and the micro-cell base station subsystem 21 includes a base transceiver system 211 for communicating with a mobile station 13. In the example, the system includes a pilot beacon transmitter (PB) 19 in addition to the micro-cell base station subsystem 21. When outside the premises, communication with the mobile station 13 may be conducted over the macro wireless network, such as via the base station 11, which operates outside the premises. However, within the premises 10, the mobile station 13 communicates through the micro-cell base station subsystem 21. The range of the micro-cell base station subsystem 21 may be limited to the store boundaries and may be positioned so that signal detection of the mobile station 13 occurs substantially as a customer enters the premises 10 rather than when outside the premises.

Optionally, the micro-cell base station subsystem 21 may be configured for low power operation to effectively limit the signal to a range on the order of close to 0 to 10 centimeters. This would allow the micro-cell to operate in the licensed spectrum within the limits of FCC 15 Part A, thereby allowing any MNO carrier to operate in the premises. To limit the signal, the level of the RF signal may be about −1.48 db.

To carry out a user or device registration with the system with micro-cell base station operating at this power level, a mobile station user would bring his mobile station 13 within the centimeter range to activate the micro-cell base station subsystem 21. Then, the on-premises elements of the system may begin the customer check-in operation described below.

FIG. 1B shows details of an exemplary micro-cell base station subsystem 21. Such a device includes a base transceiver system (BTS) 211 for radio communications and an associated controller (BSC) 212 coupled to the BTS 211, which generally controls operation of the micro-cell base station subsystem 21. The range of the BTS 211 corresponds to the intended range or size of the micro-cell base station subsystem 21. Over the airlink, the BTS 211 appears identical to a CDMA or LTE type public or macro network BTS, except for the power level and possibly the particular one or more of the licensed frequency bands on which the macro BTSs and BTSs operate.

Since the mobile stations and the interfaces/protocols used over the airlink to the BTS 211 are the same as used in the macro network, the communications may not be compatible with direct IP transport. For example, in traditional wireless systems, a dedicated link for voice is used to send the voice from one part of the network to another. In an Ethernet based link which is a shared network, voice is tagged with the IP address of the destination. Routers along the link read the IP address and forward it to right destination. Hence, the exemplary micro-cell base station subsystem 21 also includes one or more interworking or protocol conversion functions for voice and/or data. For voice, for example, the micro-cell base station subsystem 21 provides two-way conversions between the voice data format used by the mobile station 13 and MC BSS 21 and a Voice over IP (VoIP) 212a packet format. The interworking functions may be implemented by processing on the processor hardware that implements the controller (BSC) 212 for the micro-cell base station subsystem 21.

The micro-cell base station subsystem 21 further includes a packet communication interface. Although other arrangements or interface types are possible, the example uses a network interface 213 for providing packet communication with the enterprise's network 25. The network interface 213 may also provide two-way IP packet communication (e.g. for VoIP) with a wide area packet data communication network, for the mobile communications through the micro-cell base station subsystem 21. In the example of FIG. 1A, the wide area network is the public Internet 37.

A mobile service provider or carrier operates a macro cellular network to provide various communications services, such as voice, data and message transport, to its customers/users via mobile stations 13 that the carrier provides to its customers. FIG. 1A shows one such mobile station 13, by way of an example. For discussion purposes, one base station (BS) of the macro cellular communication network is shown in the drawing.

The equipment forming the micro-cell base station subsystem 21 of this type may be referred to as an IP-BTS. One such unit in a small business, for example, would allow mobile station users in or near the premises to make and receive calls and/or conduct data session via the existing broadband wireline service from the customer's Internet Service Provider (ISP), although to the mobile station the wireless communication would appear as if the communication was going through a regular macro network base station. Larger numbers of such devices can be distributed about larger enterprise premises.

For the automatic check-in, the enterprise that operates out of premises 10 has obtained and installed at least one micro-cell base station subsystem 21. As a user with a mobile station 13 roams, the mobile station 13 exchanges various signaling information with the macro cellular network, for example, through the various base stations (BSs) of the macro network. Similar signaling occurs when a mobile station 13 registers through and communicates through the micro-cell base station subsystem 21. The automated check-in functionality takes advantage of this signaling through a micro-cell base station subsystem 21 at an enterprise premises 10.

Hence, to allow an enterprise to enhance the experience that it provides to one of its customers, the system of FIG. 1A automatically determines when a customer using a mobile station 13 is within premises 10 based on mobile station signaling to/through the micro-cell base station subsystem 21 of the enterprise and provides information regarding the customer to a system of the enterprise using signaling through the micro-cell base station subsystem 21. For example, when the customer with the mobile station 13 enters the premises 10, the system recognizes the mobile station 13 by registration and provides an identification of the customer to the enterprise system.

To manage wireless calls via the micro-cell base station subsystem 21, the system 1 may include a softswitch 29 coupled to the packet data network 37. The softswitch 29 allows for communications of the mobile station 13 with the micro-cell base station subsystem 21 to register the mobile station 13 with the macro cellular network (not shown) through the micro-cell base station subsystem 21. The soft switch 29 appears as another mobile switching center to the micro-cell base station subsystem 21, e.g. via appropriate signaling and traffic communication links commonly used among MSCs. However, the softswitch 29 communicates with the micro-cell base station subsystem 21 via IP packet transport through the Internet 37.

The system may also include a customer relationship management server (CRM) 33 for responding to the identification of the mobile station 13 upon registration via the softswitch 29. The CRM server 33 responds by communicating information about a customer associated with the mobile station 13 that was identified to a system used by enterprise personnel. The CRM server 33 may also include or have access to a database 35 for storing the information about the customer associated with the mobile station 13. As shown in FIG. 1A, the CRM server 33 and/or database 35 may be located off the premises 10. However, other embodiments may include a CRM server located on the premises 10.

The information about the customer may include basic key facts about the customer, such as gender, age, geographic location or zip code. Other information such as dates of previous transactions, reports of customer activity including purchase history from sales and order processing, interactions from service contacts over the phone and via e-mail may also be included. The information may be used to provide a detailed understanding of the experience the customer has in interacting with the establishment, and allows predictions to be made regarding reasons behind customer behaviors, such as the type of product purchased, the amount of money spent, etc.

The system used by enterprise personnel may include a zone gateway server 31 coupled to a terminal 27 for use in the premises. The terminal 27 could be a laptop, a tablet, a mobile phone, or any type of device the enterprise personnel may utilize to review and use the information about the customer in a time sufficient to provide prompt service to the customer. The terminal 27 may issue different audio or tactile signals depending on the type of information received. For example, if information about the customer's home location is received, a "doorbell" chime could be emitted from the terminal 27. If information about the customer's spending habits is received, a "cash register" sound could be used.

While FIG. 1A shows only one terminal 27, in other examples, multiple terminals 27 may be used for use by personnel throughout the establishment. Further, upon multiple customers entering the establishment, the system may route the customers as they enter to different employees to ensure that the customers are served more quickly. Employees designated as customer service agents may be "on call" to receive routed customers. In other examples, the employee may have the option to deactivate the routing to his or her terminal 27 in case the employee is unavailable to assist customers, e.g., work break, performing another work function.

The information may be presented in the form of a text message, or a series of pictures accompanied by text. The information may also be scrollable or have hyperlinks associated with certain text to link to more information about the customer.

The zone gateway server 31 receives a registration message from a femtocell or picocell and forwards it to the enterprises that want to be alerted when a user registers with the femtocell or picocell. This enables enterprise personnel to connect to remote computers on a corporate network from any computer with an Internet connection, such as terminal 27. The zone gateway server 31 allows connections to a corporate network from the Internet 37 without having to set up virtual private network connections. This allows for quicker access to the information, thereby speeding up the customer interaction. The terminal 27 is used by the personnel of the enterprise to facilitate interaction with the customer while the customer is on the premises 10. The terminal 27 may receive information associated with the customer, obtained upon mobile station entry into the premises 10, so that enterprise personnel may offer specifically tailored information and notices for use with or by the customer. FIG. 1A shows that the zone gateway server 31 may be located off premises.

FIG. 2 shows a flow diagram of the operation for customer check-in. The pilot beacon transmitter (such as the pilot beacon transmitter 19 shown in FIG. 1A) associated with a micro-cell base transceiver system 211 transmits a signal in a premises 10 of an enterprise as shown in step 1. The signal may be over a frequency band allocated for mobile traffic in the macro cellular network that operates outside the premises. The pilot beacon transmitter 19 transmits in one or more of the same radio frequency bands as the macro network, but uses a different Pseudo Noise (PN) offset. The PN offset enables the mobile station 13 to identify transmissions from multiple base-stations and Pilot Beacons.

When a customer with a mobile station 13 enters the premises 10 of the enterprise, the mobile station 13 comes into range of the radio frequency coverage of a micro-cell base station subsystem 21 and pilot beacon transmitter 19. Upon coming in range to receive the RF broadcast, the mobile station 13 receives a Global Service Redirect Message (GSRDM) sent over the pilot beacon (as part of Paging Message), indicating the traffic channel band to use in communicating with the micro-cell base station subsystem 21, such as the femto cell as shown in step 2, or a pico cell. The mobile station 13 registers for mobile communication service via the micro-cell base station subsystem 21 in the premises 10, as shown in step 3. As part of this normal registration procedure, the MS ID information is transmitted from the mobile station 13 to the micro-cell base station subsystem 21.

In other examples, the GSRDM may also only be sent to the phone if the mobile station 13 is within range for predetermined period of time so people who walk in and out of the premises 10 quickly do not trigger service via the micro-cell base station subsystem 21.

The registration message received from the mobile station 13 identifies the mobile station. For example, the message may contain an identifier associated with the mobile station by the macro cellular network.

After receiving the registration message, the micro-cell base station subsystem 21 communicates via a packet data network with the softswitch 29 to register the identified mobile station 13 with the macro cellular network for mobile communication service through the micro-cell base station subsystem 21, as shown in step 4a. The micro-cell base station subsystem 21 sends a location update request, which is a signal sent to a softswitch 29 in order to request the softswitch to update the location of the mobile station 13 as known to the network. The softswitch 29, in turn, forwards location update request to Home Location Register (not shown). The softswitch 29 also sends the MDN to the micro-cell base station subsystem 21 in step 4b. The micro-cell base station subsystem 21 then transmits the registration acceptance acknowledgment from a base station to the mobile station 13 in step 5. A handoff occurs when changing connectivity of the mobile station 13 between the macro network and the micro-cell base station subsystem 21. In 3G femtocells, the calls may be dropped during the handoff. However, in LTE, this does not occur because each LTE femtocell can be uniquely identified by the macro network. As a result, the data stream of an ongoing call may be forwarded on to a target femtocell keeping the call alive during a hand-off.

For purposes of the passive automated check-in service, this mobile interaction for registering through the micro-cell base station subsystem 21 provides identification information of the mobile station 13 to a CRM server using the softswitch 29, as shown in step 6. The description "passive" is meant for operations that do not require active involvement by the customer, such as entering information on a customer terminal, or activating an application by hand. The identification information includes one or more of the various device identifiers such as IMSI, ESN, MEID, and MDN. The interaction may provide the softswitch 29 with other relevant information, such as the local time and the global positioning data (latitude and longitude information) of the mobile station 13.

FIG. 1A shows one type of mobile station 13 in use in the premises 10, for convenience. The mobile station 13 is, however, only an example of a mobile station that may be used for the customer check-in. Independent of the type of mobile station used by the customer, similar communications occur with the network.

The mobile station 13 normally communicates via a public mobile communication network, represented generically by the antenna tower of one of the cellular base stations (BS). A public wireless mobile communication network might be implemented as a network conforming to the code division multiple access (CDMA) IS-95 standard, the 3rd Generation Partnership Project 2 (3GPP2) wireless IP network standard or the Evolution Data Optimized (EVDO) standard, the Global System for Mobile (GSM) communication standard, a time division multiple access (TDMA) standard, a Long Term Evolution (LTE) standard or other standards used for public mobile wireless communications. The mobile station 13 will include one or more wireless transceivers configured to enable mobile communications via the public macro cellular communication network. The public network typically offers voice telephone communications as well as messaging and data services. The mobile station 13 at least detects certain wireless signals within the premises 10. The mobile station 13 communicates wirelessly with enterprise computer equipment, and as outlined earlier, that communication may use either the public macro network (e.g. via wireless link with base station BS) or may use wireless communications covered via the enterprise data network within the premises. For example, the mobile station 13 is capable of data communications through the base station BS of the public network (and the user thereof typically will have subscribed to data service through the public mobile communication network).

Mobile station 13 can take the form of portable handsets, smart-phones or personal digital assistants, although they may be implemented in other forms. Program applications, including an application to assist in the customer check-in can be configured to execute on many different types of mobile stations, such as mobile station 13.

In the example of FIG. 1A, the premises 10 is that of a retail establishment. For example, the enterprise operating the establishment has a pilot beacon transmitter 19 in the premises 10. If operated in the manner discussed above relative to FIG. 1A, the pilot beacon transmitter 19 is used to determine if a user having a mobile station 13 is in the premises 10. The pilot beacon transmitter 19 may be located anywhere in the premises 10 such that the mobile station 13 may be detected inside the premises 10, while not being activated by customers outside the premises.

As noted, the customer check-in within the enterprise premises 10 may be implemented by appropriate configuration of any of a variety of different types of mobile stations. However, it may be helpful to consider and discuss an example of a mobile station.

Figure 3:
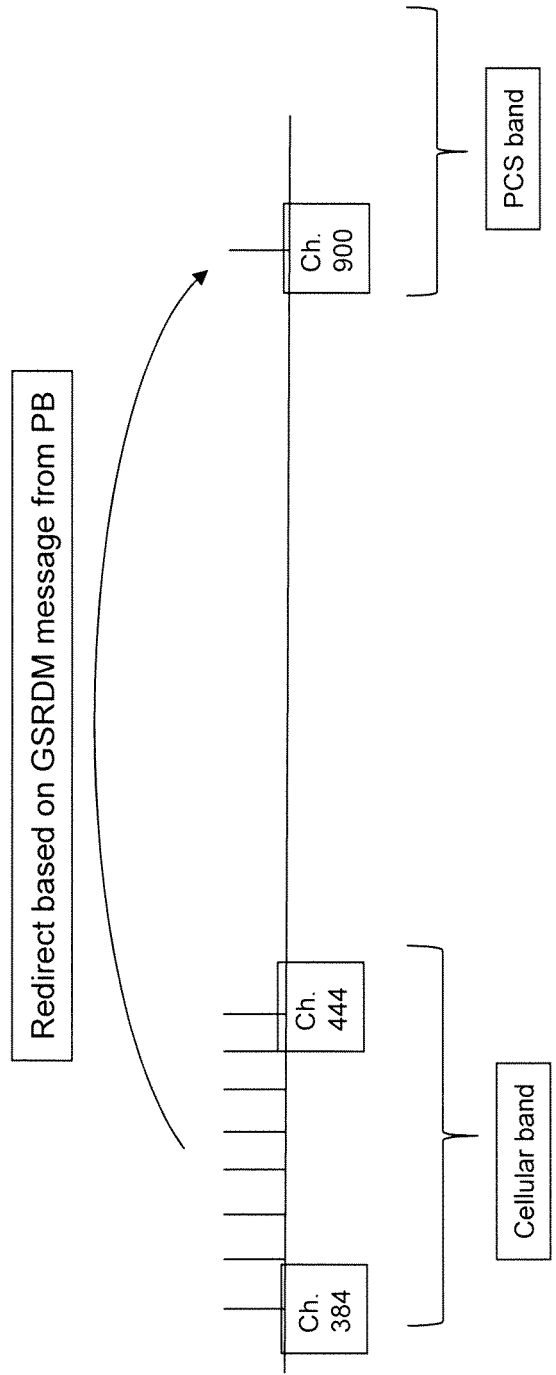
FIG. 3 is a frequency diagram showing how a mobile station is redirected to the carrier of the femto/pico cell.

In an exemplary system using the micro-cell approach, in order to significantly improve the speed of the interaction of the mobile station 13 in the retail outlet, multiple pilot beacons are utilized, as shown in FIG. 3. Normally, when a single pilot beacon transmitter 19 is used, a signal is sent out from the pilot beacon transmitter 19, starting with the first of 21 different traffic channel bands, each having a different frequency at which the mobile station 13 may operate.

Different mobile stations 13 of patrons entering the establishment are 'parked' in different channel bands based on their operations in the outside macro network prior to entering the establishment. When a phone number is programmed into a device, a preferred channel number is assigned such that there is equal distribution of mobiles across the different channels in operation in the user's area. If one beacon is used, the pilot beacon transmitter 19 sequentially hops from channel to channel until the specific frequency for the mobile station 13 is reached, at which point, the mobile station 13 can receive the GSRDM and hand over to the micro-cell base station subsystem 21 on the appropriate traffic channel band. Since it takes several seconds for the pilot beacon transmitter 19 to hop to the channel frequency, normally, it can take up to two minutes for the mobile station 13 to detect the pilot beacon and interact with the femto/pico cell to obtain a connection.

In the present specific example, a pilot beacon transmitter 19 transmits the GSRDM on all 21 traffic channel bands simultaneously, thereby ensuring that the connection is established and the mobile station 13 identified in less than 10 seconds for any mobile station 13 entering the establishment. Once the proper frequency is found, the GSRDM instructs the mobile station 13 to hop to the carrier of the micro-cell base station subsystem 21, and then registers with the network via the micro-cell base station subsystem 21.

Figure 4:
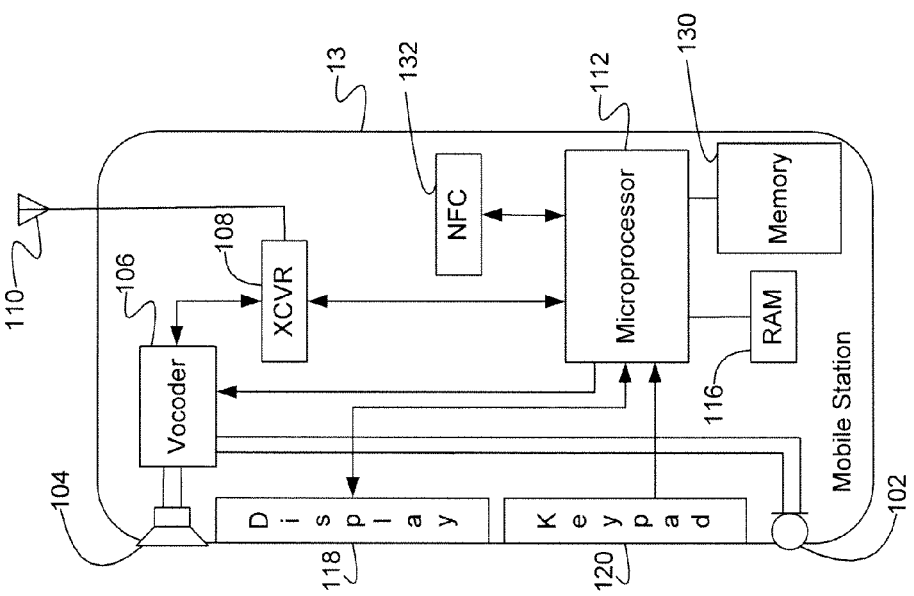
FIG. 4 is a high-level functional block diagram of an exemplary mobile station as may utilize the customer check-in through a network/system like that shown in FIG. 1.

For purposes of such a discussion, FIG. 4 provides a block diagram illustration of an exemplary non-touch type mobile station 13. Although the mobile station 13 may be a smartphone or may be incorporated into another device, such as a personal digital assistant (PDA) or the like, for discussion purposes, the illustration shows the mobile station 13 is in the form of a handset. The handset embodiment of the mobile station 13 functions as a normal digital wireless telephone station. For that function, the station 13 includes a microphone 102 for audio signal input and a speaker 104 for audio signal output. The microphone 102 and speaker 104 connect to voice coding and decoding circuitry (vocoder) 106. For a voice telephone call, for example, the vocoder 106 provides two-way conversion between analog audio signals representing speech or other audio and digital samples at a compressed bit rate compatible with the digital protocol of wireless telephone network communications or voice over packet (Internet Protocol) communications.

For digital wireless communications, the mobile station 13 also includes at least one digital transceiver (XCVR) 108 configured to enable mobile communications via a public macro cellular communication network, for example, via the base station (BS) shown in FIG. 1A. Today, the mobile station 13 would be configured for digital wireless communications using one or more of the common network technology types. The concepts discussed here encompass embodiments of the mobile station 13 utilizing any digital transceivers that conform to current or future developed digital wireless communication standards. The mobile station 13 may also be capable of analog operation via a legacy network technology.

The transceiver 108 provides two-way wireless communication of information, such as vocoded speech samples and/or digital information. The transceiver 108 also sends and receives a variety of signaling messages in support of the various voice and data services provided via the mobile station 13 and the communication network. Each transceiver 108 connects through RF send and receive amplifiers (not separately shown) to an antenna 110. The transceiver 108 may also support various types of mobile messaging services, such as short message service (SMS), enhanced messaging service (EMS) and/or multimedia messaging service (MMS). In most modern implementations of the mobile station 13, one or more of the wireless transceiver 108 provides two-way wireless packet data communications via the public mobile communication network. The data communication capabilities of the transceiver 108 and the public network enable a wide range of packet-based communication services, such as browsing the World Wide Web, selecting and downloading multimedia content and/or application programs for the mobile station, email communications, etc.

The mobile station 13 includes a display 118 for displaying messages, menus or the like, call related information dialed by the user, calling party numbers, etc. A keypad 120 enables dialing digits for voice and/or data calls as well as generating selection inputs, for example, as may be keyed-in by the user based on a displayed menu or as a cursor control and selection of a highlighted item on a displayed screen. The display 118 and keypad 120 are the physical elements providing a textual or graphical user interface. Various combinations of the keypad 120, display 118, microphone 102 and speaker 104 may be used as the physical input output elements of the graphical user interface (GUI), for multimedia (e.g., audio and/or video) communications. Of course other user interface elements may be used, such as a touchscreen, as in some types of smartphones.

In addition to normal telephone and data communication related input/output (including message input and message display functions), the user interface elements also may be used for display of menus and other information to the user during the customer check-in.

A microprocessor 112 serves as a programmable controller for the mobile station 13, in that it controls all operations of the mobile station 13 in accord with programming that it executes, for all normal operations, and for operations involved in the check-in procedure under consideration here. In the example, the mobile station 13 includes a program memory 130 for containing the various applications used in the mobile station 13.

NFC is a set of standards for smart phones and similar devices, such as the mobile stations (e.g. 13) discussed herein, to establish radio communication with other such devices as well as with compatible NFC readers (e.g. 901) by coming to close proximity (e.g., 4-10 cm or less). Due to its short range and support for encryption, NFC communication is suitable for secure communication over short distances. Each NFC enabled mobile station or NFC reader includes a transceiver configured to communicate with other NFC capable equipment.

Hence, the exemplary mobile station 13 further includes a near field communication (NFC) radio frequency transceiver 132. For example, a transceiver comprises an NFC chipset, which provides two-way wireless communication of information in accordance with NFC technology and protocols. The NFC chipset also sends and receives a variety of signaling messages for establishing NFC links with other NFC-enabled devices. The NFC chipset connects to a NFC antenna (not separately shown), which is used for transmitting and receiving NFC communications to/from other NFC compatible devices. Some modern mobile stations are already coming equipped with such NFC equipment, and increased NFC deployment is expected in the near future. The NFC transceiver 132 supports communications similar to RFID signals, which may allow interaction between the mobile station 13 and the NFC reader 901 described below.

The mobile station 13 may also include a non-volatile random access memory (RAM) 116 for a working data processing memory. Of course, other storage devices or configurations may be added to or substituted for those in the example.

As outlined above, the mobile station 13 includes a processor 112, and programming stored in the program memory 130 configures the processor 112 so that the mobile station 13 is capable of performing various desired functions, including in this case the functions involved in providing a customer check-in.

The structure and operation of a mobile station, such as exemplary station 13 outlined above, were described to by way of example, only.

As shown by the above discussion, functions relating to customer check-in, provided via a graphical user interface of a mobile station may be implemented on a mobile station and/or on computers connected for data communication via the components of a packet data network, operating as a location server and/or a database as shown in FIG. 1A.

The structure of an exemplary mobile station has already been discussed relative to FIG. 1A. The mobile station software functionalities involve programming, including executable code as well as associated stored data, e.g. files used for the customer check-in. The software code is executable by the processor of the mobile station, such as the microprocessor 112. In operation, the code is stored within the mobile station, e.g. in memory 130. At other times, however, the software may be stored at other locations and/or transported for loading into the mobile station. Execution of such code by a processor of the mobile station platform enables the mobile station to implement mobile station aspects of the methodology for the customer check-in in essentially the manner performed in the implementations discussed and illustrated herein.

Figure 5:
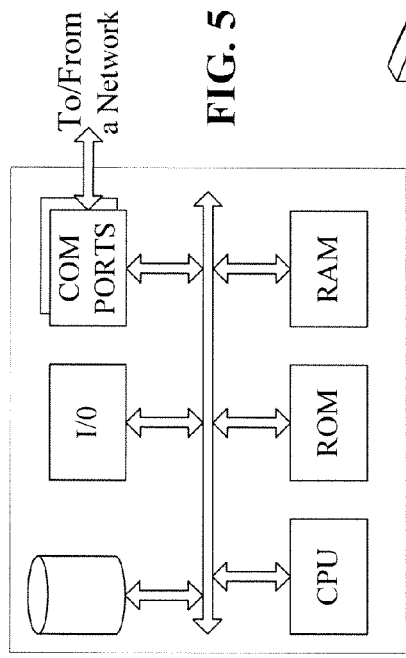
FIG. 5 is a simplified functional block diagram of a computer that may be configured as a host or server, for example, to function as one of the servers in the system of FIG. 1.
Figure 6:
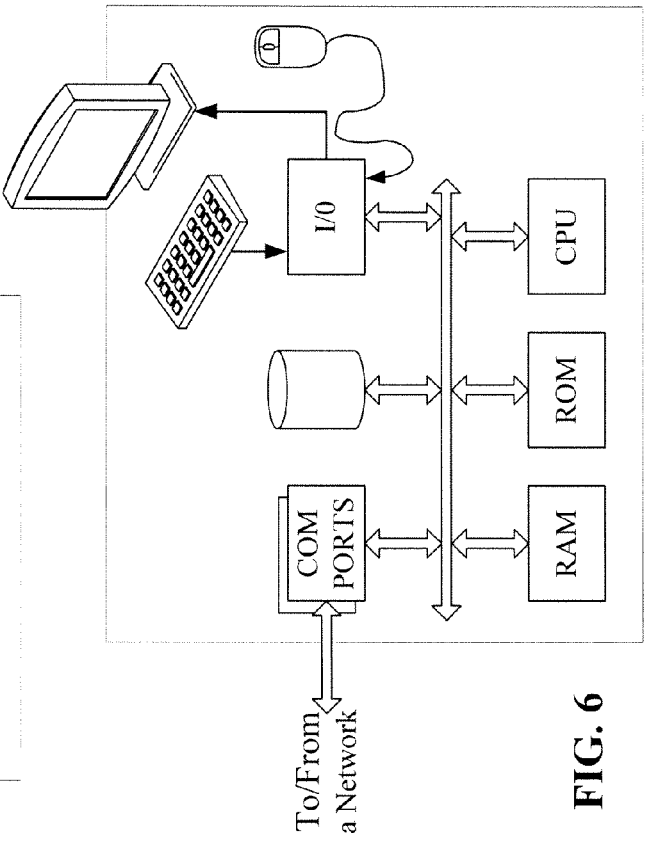
FIG. 6 is a simplified functional block diagram of a personal computer or other work station or terminal device.

As shown in the discussion above, some aspects of the communications relating to customer check-in may be implemented on computers or the like. For completeness, FIGS. 5 and 6 provide functional block diagram illustrations of general purpose computer hardware platforms. FIG. 5 illustrates a network or host computer platform, as may typically be used to implement a server. FIG. 6 depicts a computer with user interface elements, as may be used to implement a personal computer or other type of work station or terminal device, although the computer of FIG. 6 may also act as a server if appropriately programmed. It is believed that these drawings should be self-explanatory.

In other embodiments, instead of a passive system using femtocells to register the mobile station, an active approach may be used. The underlying technology and call-flow may be essentially the same as for the passive approach described above except that a femtocell radiates an RF signal at very low power levels. As such, a user actively registers his/her mobile station by placing the mobile station within a centimeter or two of the kiosk. As the signal radiates at a very low power level, a kiosk can be operated under the purview of FCC Part 15 A, allowing the kiosk to operate in all the MNOs bands without requiring a license from the FCC.

Figure 7:
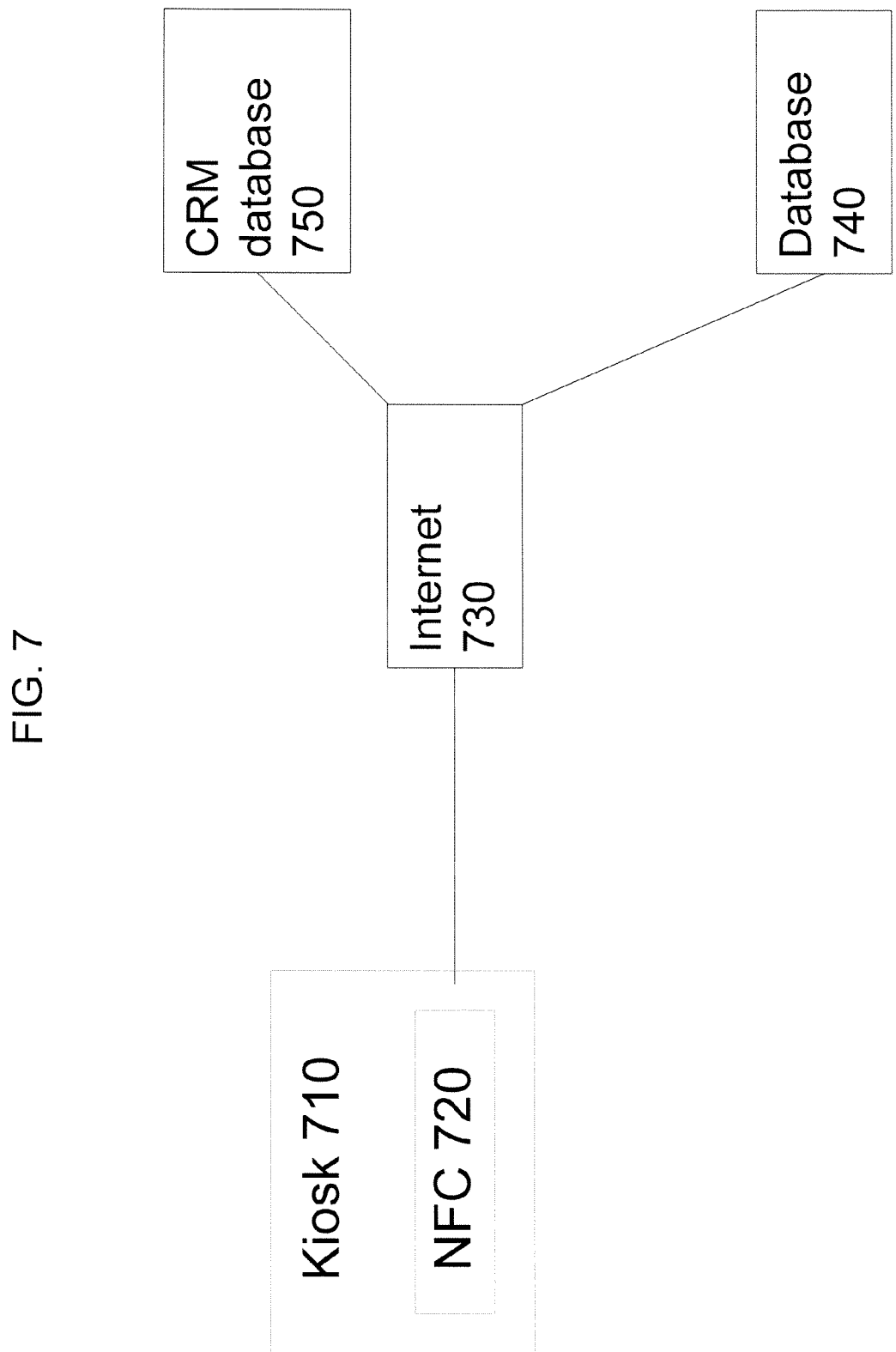
FIG. 7 is a simplified block diagram of a kiosk for use in customer check-in in an establishment.

One or more kiosks 710, such as that shown in FIG. 7, may be placed in an establishment with which the mobile station customer may interact. The kiosk 710 may be a stand-alone unit that is the size, for example, of a tablet computer and may be provided at predetermined positions around an enterprise, for example near the entrance(s) of the premises and/or around area(s) of likely high foot traffic such as where a new product is being displayed. The kiosk 710 may also use NFC-based technology 720 in communicating with the mobile station. In particular, the mobile station may interact with the kiosk 710 when the two are in close proximity such that the mobile station ID information/user ID information is conveyed to the kiosk 710 via NFC 720. The kiosk 710 may then transmit the received identification information to the various store 740 and customer relationship management 750 databases via the internet 730 in order to obtain information about the customer associated with the identification information. The information may then be forwarded to a terminal or other display within the establishment for use in customer relationship enhancement by the employees of the establishment.

Figure 8:
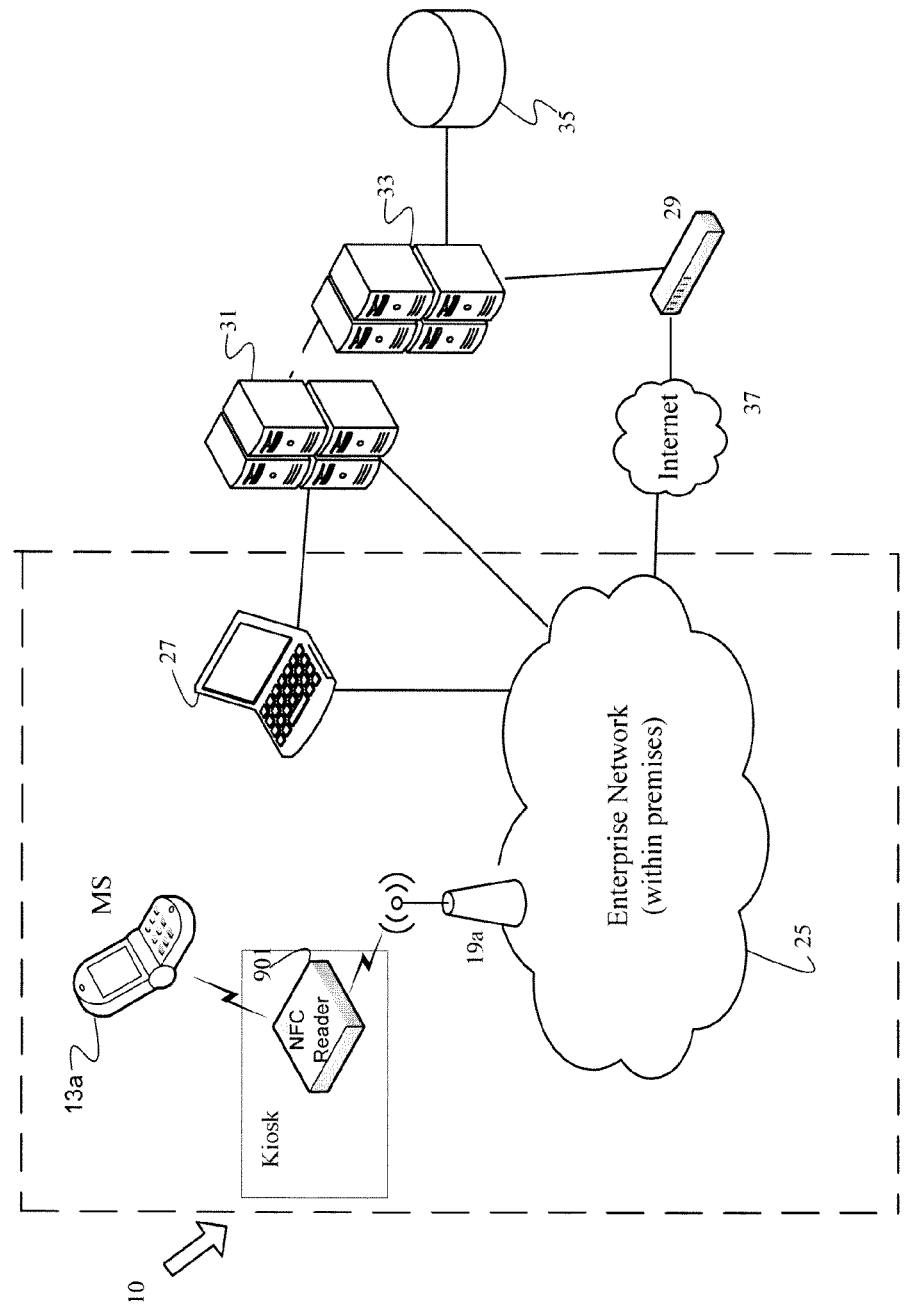
FIG. 8 is a high-level functional block diagram of an example of a system of networks/devices that provide various communications for mobile stations and support an example of the customer check-in using NFC.

FIG. 8 shows a representation of an establishment that performs customer check-in using a kiosk 900 housing an NFC reader 901 according to another embodiment of the present disclosure.

NFC is a set of standards for smart phones and similar devices, such as the mobile station 13 discussed herein, to establish radio communication with other such devices as well as with compatible NFC readers by coming to close proximity. Due to its short range and support for encryption, NFC communication is suitable for secure communication over short distances. Accordingly, NFC technology is included in mobile station 13a as well as NFC reader 901.

Like the mobile station, the NFC reader 901 includes a transceiver configured to communicate with NFC capable mobile station 13a. For example, a transceiver comprises an NFC chipset. The NFC reader 901 provides two-way wireless communication of information in accordance with NFC technology and protocols. For example, a user of a mobile station 13a can touch the mobile station 13a to the NFC reader portion of a kiosk 900 located in a commercial establishment, and data is transferred from the mobile station to and through the terminal 901, e.g., to facilitate customer check-in. In other examples, more than one NFC reader 901 may be conveniently located throughout one or more premises of the establishment if desired.

As with the femtocell based examples above, the NFC reader 901 is connected to a private enterprise network 25 in order to relay information to and from the establishment. A wireless access point 19a may be used to allow communication between the NFC reader 901 and the network 25. In other examples, the communication between the NFC reader and the network may be via wiring. In the other aspects of the example, the kiosk based design relays information directly to the establishment. In this example, the information may be that a customer has entered the premises.

Figure 10:
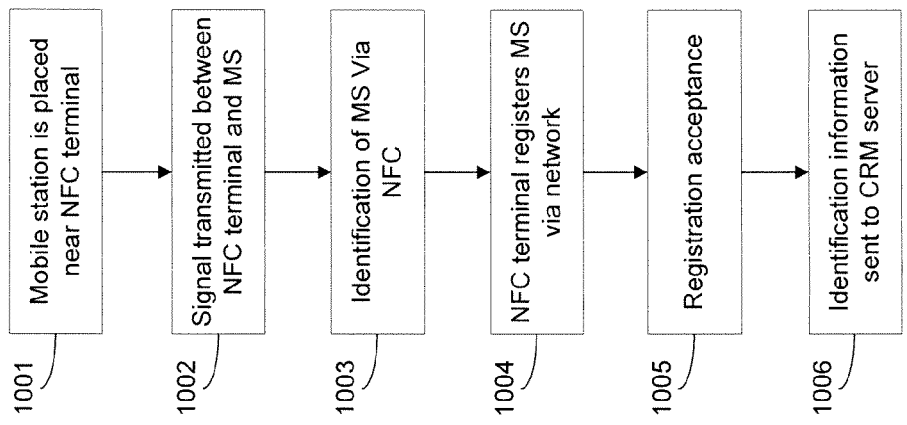
FIG. 10 is a flowchart of an exemplary method for presenting an NFC-based customer check-in in an establishment.

The wireless access point 19a may further include a packet communication interface for providing packet communication with the enterprise's network 25. Two-way IP packet communication (e.g. for VoIP) with a wide area packet data communication network, for the mobile communications through the wireless access point 19a. In the example of FIG. 8, the wide area network is the public Internet 37. The NFC reader may include a Wifi transceiver 950 may to communicate with the wireless access point, as is shown in FIG. 10.

A mobile service provider or carrier operates a macro cellular network to provide various communications services, such as voice, data and message transport, to its customers/users via mobile stations 13 that the carrier provides to its customers. FIG. 8 shows one such mobile station 13a, by way of an example. For discussion purposes, one base station (BS) of the macro cellular communication network is shown in the drawing.

The system may also include a customer relationship management server 33 for responding to the identification of the mobile station 13 upon registration via the softswitch 29. The customer relationship management (CRM) server 33 responds by communicating information about a customer associated with the mobile station 13 that was identified to a system used by enterprise personnel. The CRM server 33 may also include or have access to a database 35 for storing the information about the customer associated with the mobile station 13. As shown in FIG. 8, the CRM server 33 and/or database 35 may be located off the premises 10. However, other embodiments may include a CRM server located on the premises 10.

The system used by enterprise personnel may include a zone gateway server 31 coupled to a terminal 27 for use in the premises. The terminal 27 could be a laptop, a tablet, a mobile phone, or any type of device the enterprise personnel may utilize to review and use the information about the customer in a time sufficient to provide prompt service to the customer. The terminal 27 may issue different audio or tactile signals depending on the type of information received. For example, if information about the customer's home location is received, a "doorbell" chime could be emitted from the terminal 27. If information about the customer's spending habits is received, a "cash register" sound could be used.

The information may be presented in the form of a text message, or a series of pictures accompanied by text. The information may also be scrollable or have hyperlinks associated with certain text to link to more information about the customer.

The zone gateway server 31 receives a registration message from the NFC reader 901 and forwards it to the enterprises that want to be alerted when a user registers with the kiosk 900. This enables enterprise personnel to connect to remote computers on a corporate network from any computer with an Internet connection, such as terminal 27. The zone gateway server 31 allows connections to a corporate network from the Internet 37 without having to set up virtual private network connections. This allows for quicker access to the information, thereby speeding up the customer interaction. The terminal 27 is used by the personnel of the enterprise to facilitate interaction with the customer while the customer is on the premises 10. The terminal 27 may receive information associated with the customer, obtained upon customer check-in, so that enterprise personnel may offer specifically tailored information and notices for use with or by the customer. FIG. 8 shows that the zone gateway server 31 may be located off premises.

Figure 9:
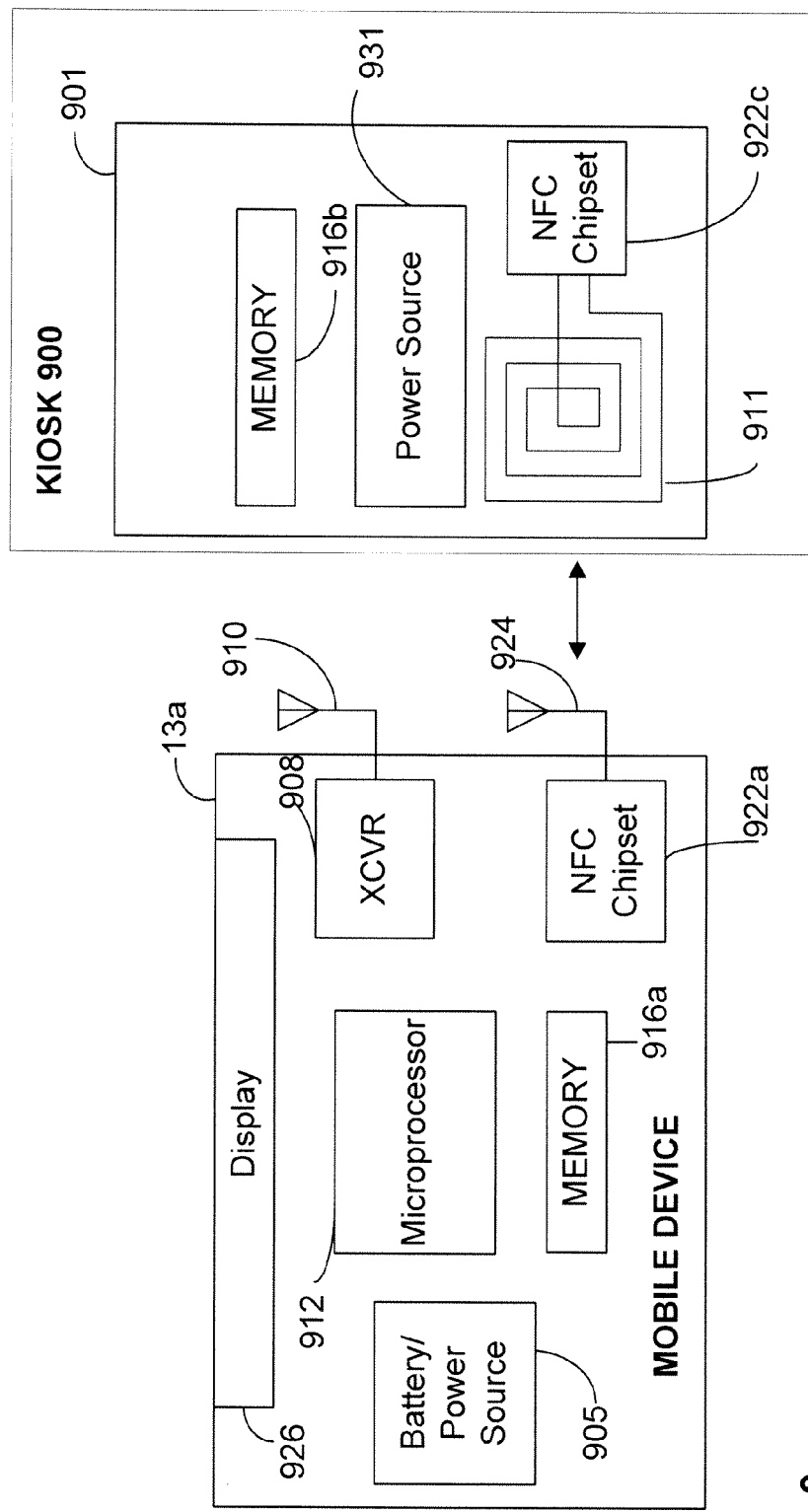
FIG. 9 is a functional block diagram of an example of a mobile station and kiosk example of a customer-accessible station at an enterprise premises.

FIG. 9 illustrates details of an exemplary kiosk containing an NFC reader 901 that is in wireless communication with a mobile station 13a. The simplified block diagram of the mobile station 13a includes a display 926, a battery/power source 905, a microprocessor 912, a memory 916a, and an NFC chipset 922a capable of communicating with an NFC chipset 922c that is NFC compatible via antenna 924. In one example, mobile station 13a includes a transceiver 908 that is capable of communication with the customer relationship management server 33 through a mobile communication network and the internet 37 (as shown in FIG. 8) via antenna 910 as discussed above. All other components of a mobile station 13a are similar to that of mobile station 13 discussed above with reference to FIG. 4.

In the example of FIG. 9, the mobile station 13a communicates with NFC reader 901 to check in with the NFC reader 901 by NFC communication. NFC generally involves an initiator and a target. For example, a mobile station 13a (e.g., an initiator in this example) may generate an RF field via its inductive antenna 924 that is received by antenna 911 of the NFC reader 901. In this example, both the NFC reader 901 and the mobile station 13a may include a battery/power source, 905 and 931 respectively. In this regard, NFC peer-to-peer communication is possible between the mobile station 13a and the NFC reader 901 and either device (e.g., NFC reader 901 or the mobile station 13a) can be an initiator.

FIG. 10 illustrates an exemplary flow wherein an NFC enabled mobile station 13a communicates with an NFC reader 901. The mobile station 13a is placed in the premises 10 of an enterprise as shown in step 1001. For NFC to operate, generally, the distance from the mobile station 13a to the NFC reader 901 is less than 10 cm.

After placement of the mobile station 13a, the mobile station 13a and NFC reader 901 may exchange data over the NFC link established between the two entities. As part of the exchange between the mobile station 13a and the NFC reader 901, a customer's unique identification, e.g., the MDN, a retailer App ID, loyalty number or any such unique identification that uniquely identifies the user to the retailer, is sent by the mobile station 13a to the NFC reader 901. The NFC reader 901 may then forward this unique identification to either the zone gateway server 31 or directly to a retailer's CRM 33.

In other examples, the NFC reader 901 may be connected to the local wired enterprise network 25, which forwards the unique identification to the establishment terminal 27. If there is no local wired network 25, the message can be forwarded via WiFi within the premises or through wireless broadband which may connect the NFC Receiver/Kiosk to zone gateway 31 or directly to CRM 33.

For purposes of the active automated check-in service, this mobile interaction for registering through the NFC reader 901 provides identification information of the mobile station 13 to a CRM server, as shown in step 1006. The identification information includes one or more of the various device identifiers such as IMSI, ESN, MEID, and MDN or retailer's loyalty number. The interaction may provide other relevant information, such as the local time and the global positioning data (such as latitude and longitude information) of the mobile station 13a or premises.

Another feature of the use of NFC is to provide a secure link with the establishment that is free from hacking. The NFC may be used separately, or combined with the femtocell based check-in. If used in combination with a femtocell based check-in approach, different information can be provided via NFC than via femtocell. The information obtained via NFC may be used as a check to provide an additional layer of security or to enable additional predetermined functionality on, or provide additional promotional material to, the mobile station. For example, the user may provide a personal identification number (PIN) issued by the establishment to access areas that require increased security, e.g., a bank or storage area.

The network 25 provides similar communications for many other similar users as well as for mobile stations/users that do not participate in NFC-based services (e.g., regular mobile stations such as cell phones, tablet computers, etc. that do not include an NFC chip set). Thus, network 25 may provide regular voice and data cellular services. The network 25 provides wireless communications services to the computing devices and other mobile stations (not shown), for example, via a number of base stations BS. The present techniques may be implemented in any of a variety of available mobile networks 25 and/or on any type of computing device compatible with such a network 25, and the drawing shows only a very simplified example of a few relevant elements of the network 25 for purposes of discussion here.

In another embodiment of the present disclosure, a mobile station 13 may use its speaker to initiate a "chirp" or other short characteristic emission of multiple frequencies that is unlikely to be inadvertently generated by any device in the vicinity. This sound may be detected by microphones within a premises to acknowledge the presence of a customer. The mobile station 13 modulates tones in 18 KHz-21 KHz range to encode a user's unique ID. These tones are then played on the mobile station's speaker 104. The microphone 1101 always listens for signals in the 18 KHz-21 KHz range and decodes and recovers the user's unique ID.

Figure 11:
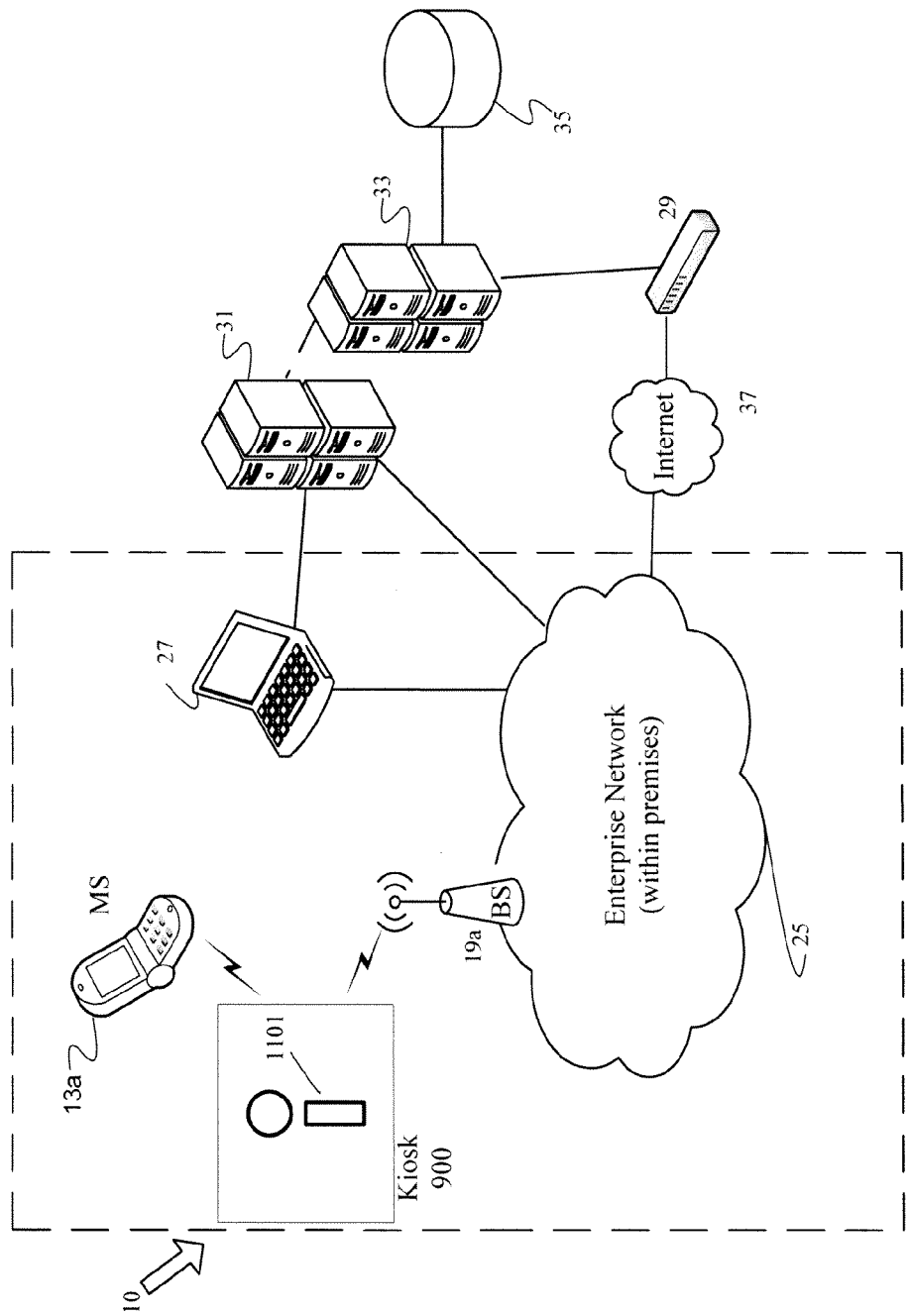
FIG. 11 is a high-level functional block diagram of an example of a system of networks/devices that provide various communications for mobile stations and support an example of the customer check-in using audio detection.

For example, as shown in FIG. 11, the premises are arranged in a similar manner as that in FIG. 8, except that the NFC reader has been replaced by a microphone 1101 (although in different embodiments, the microphone may be embedded within another device such as the NFC reader). In this embodiment, only one microphone 1101 is shown. However, multiple microphones 1101 may be placed throughout the premises 10 as necessary.

In one example, the microphone 1101 is associated with the kiosk 900, so that a customer having a mobile station 13*a* equipped with sound making software may generate a sound from the mobile station 13*a* when in the proximity of the kiosk 900. The customer should be close enough to the kiosk 900 so that the microphone in the kiosk 1101 can detect the sound generated by the mobile station 13*a*. The customer may generate the sound, for example via an application, such as pressing the screen on the mobile station 13*a*, or by waving the mobile station 13*a* near the microphone. Upon activation of the sound generating application, the mobile station 13*a* may generate the sound for a period of time sufficient for the microphone 1101 to detect the sound emitted from the mobile station 13*a*.

The emitted sound may contain a alpha-numeric code to identify the user of the mobile station 13*a*. As an example, a series of different high frequencies, each associated with a different number can be used to transmit the user's MDN. The sound may have a frequency that is in a range inaudible to humans. Generally, inaudible sound may have frequencies greater than approximately 16K Hz.

Once the microphone 1101 receives the sound, the communications interface, such as a wireless access point 19*a*, transmits the information, via the enterprise network, so that the establishment can then communicate with the CRM 33 in a similar manner to that described above to allow the establishment to obtain customer information. The communication between the microphone and enterprise network may be via Wifi, Bluetooth or wiring. In some examples, the signal received by the microphone 1101 is converted into digital information for sending to the CRM 33 via the communication interface. This may be accomplished by an analog-to-digital converter.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile station type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature.

As known in the data processing and communications arts, software functionalities involve programming, including executable code as well as associated stored data, e.g. files used for the customer check-in. The software code is executable by the general-purpose computer that functions as the location server. In operation, the code is stored within the general-purpose computer platform. At other times, however, the software may be stored at other locations and/or transported for loading into the appropriate general-purpose computer system. Execution of such code by a processor of the computer platform enables the platform to implement the server/database aspects of the methodology for customer check-in in essentially the manner performed by the server and/or database in the implementations discussed and illustrated herein.

Hence, aspects of the communications outlined above may be embodied in programming. Program aspects of the technology may be thought of as "products" or "articles of manufacture" typically in the form of executable code and/or associated data that is carried on or embodied in a non-transitory or other type of machine readable medium, for execution by a processor of a particular element of the system shown in the drawings and/or described above.

In the examples, the enterprise is a commercial establishment, e.g. offering goods and/or services to customers or potential customers when present within the premises 10. However, the technology discussed herein may be applicable to facilities of other types of enterprises, such as non-profit organizations, schools of various levels, government entities, etc.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A system, comprising:
   a customer-accessible station;
   a micro-cell base station subsystem installed in the customer-accessible station for use in a premises of an enterprise, the micro-cell base station subsystem comprising:
   (a) a base transceiver system configured for wireless communication with one or more mobile stations over a frequency band allocated for mobile traffic in a macro cellular network operating in a region outside the premises of the enterprise;
   (b) a communication interface, coupled to the base transceiver system, configured to send and receive communications for the one or more mobile stations via a packet data network; and
   (c) a controller, coupled to the base transceiver system and the communication interface, configured to operate the micro-cell base station subsystem to appear to the one or more mobile stations as a base station similar to a base station of the macro cellular network, and configured to register the one mobile station with the micro-cell base station subsystem;
   a softswitch coupled to the packet data network for communications with the micro-cell base station subsystem, the softswitch being configured to register the one mobile station with the macro cellular network through the micro-cell base station subsystem, upon the registration of the one mobile station with the micro-cell base station subsystem;
   a customer management server, configured to receive, upon the registration of the one mobile station with the macro cellular network via the softswitch, identification of the one mobile station via the softswitch, and wherein the customer management server is configured to respond to the received identification by communicating information about a customer associated with the one identified mobile station, to another system including a server coupled to a terminal, wherein the other system is configured to provide personnel of the enterprise at the premises with a notification according to the information, notifying the personnel of availability of the customer for interaction, while the customer is at the premises.

2. The system of claim 1, wherein the micro-cell base station subsystem comprises a femto or pico cell base station.

3. The system of claim 1, wherein:
   the controller is configured to cause the micro-cell base station subsystem to transmit the identification of the mobile station via the communication interface and the packet data network, to register the one mobile station with the softswitch; and
   the customer management server is configured to receive the identification upon completion of the registration of the one mobile station with the softswitch.

4. The system of claim 1, further comprising a transmitter configured to transmit a pilot beacon in each of a plurality of frequency bands used by base stations of the macro cellular network outside the premises of the enterprise.

5. The system of claim 4, wherein the pilot beacon transmitted in at least one of the frequency bands contains a redirect message indicating a specific frequency band allocated for mobile traffic for use in communicating with the base transceiver system.

6. The system of claim 1, wherein the information about the customer associated with the identified mobile station includes a user mobile station number, a local time of the mobile station and information of a location of the micro-cell base station subsystem.

7. The system of claim 1, further comprising a near field communication (NFC) transceiver, installed in the customer-accessible station and configured to interact with another NFC transceiver of the one mobile station; and
   another communication interface, coupled to the NFC transceiver, configured to send and receive communications of the one mobile station via an enterprise network.

8. The system of claim 7, wherein the NFC transceiver sends and receives communications to and from the customer management server via the enterprise network.

9. A system, comprising:
   a customer-accessible station comprising:
      a near field communication (NFC) transceiver configured for wireless communication with one or more mobile stations;
      a communication interface, coupled to the NFC transceiver, configured to send and receive communications of the one or more mobile stations via a network; and
   a customer management server configured to obtain identification of the one mobile station, from the customer-accessible station via the network, upon registration of the one mobile station with the customer-accessible station;
   wherein the customer management server is configured to respond to the obtained identification by communicating information about a customer associated with the one identified mobile station to another system including a server and a terminal, wherein the other system is configured to provide personnel of the enterprise at the premises with a notification according to the information, notifying the personnel of availability of the customer for interaction, while the customer is at the premises.

10. The system of claim 9, wherein the information about the customer associated with the identified mobile station includes a user mobile station number, a local time of the mobile station and information of a location of the mobile station.

11. The system of claim 9, wherein the NFC transceiver is further configured to transmit a message directly to the other system to alert the personnel that the customer associated with the one identified mobile station has entered the premises.

12. A system, comprising:
a customer-accessible station comprising:
a microphone configured to detect an encoded predetermined sound from one or more mobile stations that are at a premises of an enterprise and further configured to decode an identification of the one mobile station from the detected predetermined sound;
a communication interface, coupled to the microphone, configured to send and receive communications for the one mobile station via a packet data network; and
a customer management server, configured to obtain the identification of the one mobile station, from the customer-accessible station, upon registration of the one mobile station with the customer-accessible station, and further configured to respond to the identification of the one mobile station by communicating information about a customer associated with the one identified mobile station to another system including a server coupled to a terminal, wherein the other system is configured to provide personnel of the enterprise at the premises with notification according to the information, notifying the personnel of availability of the customer for interaction, while the customer is at the premises.

13. The system of claim 12, wherein the information about the customer associated with the identified mobile station includes a user mobile station number, a local time of the mobile station and information of a location of the mobile station.

14. The system of claim 12, wherein the encoded predetermined sound is converted into digital information prior to being decoded and sent to the customer management server via the communication interface.

15. The system of claim 12, wherein the encoded predetermined sound, received by the microphone, is a high frequency sound that has a frequency in a range inaudible to humans.

16. A system, comprising:
one or more computer processors; and
a non-transitory computer readable medium containing instructions that, when executed, cause the one or more processors to perform the steps of:
detecting, by a near field communication terminal, a signal generated by a mobile station, when the mobile station is brought within approximately 10 cm or less of the near field communication terminal containing a near field communication transceiver at a premises of an enterprise;
transmitting another signal from the near field communication transceiver to the mobile station;
receiving, via the NFC transceiver, a registration message from the mobile station in the premises responsive to the other transmitted signal, the registration message including an identification of the mobile station;
registering the identification of the mobile station with the near field communication terminal;
communicating via a packet data network the identification of the mobile station to a customer management server;
receiving, from the customer management server information about a customer associated with the identified mobile station; and
upon registering the identified mobile station and receiving the information, forwarding the information to another system including a server coupled to a terminal, wherein the other system is configured to provide personnel of the enterprise at the premises with a notification of availability of the customer for interaction, while the customer is within the premises of the enterprise.

17. The system of claim 16, wherein:
the information about the customer associated with the identified mobile station includes a user mobile station number, a local time of the identified mobile station and information about a location of the identified mobile station.

18. The system of claim 16, wherein the one or more processors are further caused to perform the step of:
transmitting a message directly to the other system to alert the personnel that the customer associated with the identified mobile station has entered the premises.

19. The system of claim 9, wherein the information communicated by the customer management server to the other system includes history of purchases made by the customer and reports of previous interactions of the customer with service personnel of the enterprise over email and phone.

20. The system of claim 12, wherein the information communicated by the customer management server to the other system includes history of purchases made by the customer and reports of previous interactions of the customer with service personnel of the enterprise over email and phone.

* * * * *